Feb. 2, 1971 H. C. SCHROEDER 3,560,855

AUTOMATIC EQUALIZER UTILIZING ERROR CONTROL INFORMATION

Filed June 7, 1968 2 Sheets-Sheet 1

INVENTOR
BY H. C. SCHROEDER
J. P. Kearns
ATTORNEY

Feb. 2, 1971 H. C. SCHROEDER 3,560,855

AUTOMATIC EQUALIZER UTILIZING ERROR CONTROL INFORMATION

Filed June 7, 1968 2 Sheets-Sheet 2

United States Patent Office 3,560,855

Patented Feb. 2, 1971

3,560,855

AUTOMATIC EQUALIZER UTILIZING ERROR CONTROL INFORMATION

Henry C. Schroeder, East Brunswick, N.J., assignor to Bell Telephone Laboratories, Incorporated, Murray Hill, N.J., a corporation of New York Filed June 7, 1968, Ser. No. 735,444
Int. Cl. H04b 3/14
U.S. Cl. 325—30 9 Claims

ABSTRACT OF THE DISCLOSURE

An automatic passband equalizer for differentially coherent phase-modulation data transmission systems is made adaptive to error information derived by correlating phase differences between successive adjacent signaling intervals with phase differences between nonadjacent signaling intervals spanning such adjacent intervals. The error information is periodically integrated and quenched. Differences between successive maximum integration levels yield a distortion index by the aid of which incremental adjustments of tap attenuators in a transversal equalizer in series with a data demodulator are directed to minimize such distortion.

FIELD OF THE INVENTION

This invention relates to the compensation of the distorting effects of transmission channels on phase-modulated digital data signals and in particular to the equalization of such channels adaptive to error control information.

BACKGROUND OF THE INVENTION

The modulation and detection arrangement best suited for telephone-line digital data transmission appears to be phase modulation. Great immunity against noise together with insensitivity to level variations can be achieved. However, the many points of discontinuity in the telephone network due to the uses of different types of transmission facility, wire, cable and radio, for example, result in inevitable frequency and phase shifts in tandem signal paths. Differentially coherent demodulation, which uses the delayed previous signaling interval as a phase reference for the current signaling interval, minimizes the effects of unwanted phase shifts, but there nevertheless remains some residual phase distortion that can produce errors. The existence of such phase distortion does limit the maximum data rates reliably obtainable in unequalized transmission facilities. Leased wire facilities are generally provided with compromise equalization networks and over such facilities binary data rates of 2400 bits per second are routinely realized. On the switched network, however, where such equalization is not readily provided, data rates are generally limited to 2000 bits per second.

Equalization systems for linear modulation schemes, such as amplitude modulation, have been developed. These equalization systems employ transversal equalizers in which the impulse response of the overall transmission facility at sampling instants can be monitored at the data receiver. Attenuated samples of leading and lagging distortion components can then be combined to compensate for imperfections in the impulse response. As reviewed by R. W. Lucky in his paper "Techniques for Adaptive Equalization of Digital Communications Systems" (Bell System Technical Journal, vol. XLV, No. 2 at pp. 255–286, February 1966), such systems can be implemented prospectively before message transmission by the use of a training period of test pulse transmission or adaptively during message transmission by the use of periodic or aperiodic estimates of channel impulse response based on received data signals.

In phase modulation systems, however, demodulation is a nonlinear process involving product modulation of successive signal phases. Therefore, the straightforward tap-by-tap adjustment algorithms developed for impulse-response equalization of linear modulation systems have no application to the equalization of phase-modulation systems.

Automatic transversal equalizers have also been developed for compensating the frequency response of communication channels, as discussed by R. W. Lucky and H. R. Rudin in their paper entitled "An Automatic Equalizer for General Purpose Communication Channels" (Bell System Technical Journal, vol. XLVI, No. 9, pp. 2179–2208, November 1967). These equalizers monitor the difference at periodic sampling instants between the actual response and a specified response of a linear transmission medium. A test signal transmitted over the channel is required in this so-called mean-square equalizer for prospective equalization prior to message transmission. Such an equalizer can also be rendered adaptive to a continuous test signal superimposed on the message signal. The mean-square equalizer is applicable to phase-modulation systems, but is somewhat more complex in its implementation than the zero-forcing equalizer.

In my copending joint application with J. R. Sheehan, Ser. No. 728,156 filed May 10, 1968, a nonredundant error detection and correction scheme for single errors occurring in a differentially coherent phase-modulation data transmission system is disclosed. The inherent error detecting capability of differentially coherent phase modulation is there exploited. Dibit signal pairs demodulated from the phase differences between successive adjacent signaling intervals are logically compared with dibits demodulated from the phase differences between nonadjacent signaling intervals spanning such successive adjacent signaling intervals to generate error signals. These error signals are synchronously sampled to trigger an error correction circuit. It has since been realized that this error signal can be considered an index of instantaneous distortion and hence has possible application to the control of a line signal equalizer. How this can be accomplished is the subject matter of this invention.

It is an object of this invention to adapt the transversal equalizer to the compensation of distortion in nonlinear modulation digital data transmission systems.

It is another object of this invention to equalize nonlinear modulation data transmission systems adaptively during message transmission without the use of transmitted test signals.

It is a further object of this invention to equalize differentially coherent data transmission systems adaptively during message transmission in accordance with the occurrence of detected demodulation errors.

SUMMARY OF THE INVENTION

According to this invention, a transversal equalizer located in series with the incoming line signal in a receiver for a differentially coherent phase-modulation data transmission system is provided with tap attenuators which are sequentially and incrementally adjusted under the control of an error signal derived from a logical comparison of signal dibits demodulated in successive adjacent signaling intervals with signal dibits demodulated in nonadjacent signaling intervals. The transversal equalizer comprises a multiply tapped delay unit in tandem with the received line signal at the carrier passband frequency level, an adjustable attenuator at each tap but one designated the reference tap, and a summing circuit combining the output of the reference tap with the attenuated outputs of all other taps. The tap attenuators are to be adjusted over a range of plus and minus unity gain in such a way that their net output is at a minimum and the significant output of the equalizer is substantially only the signal appearing in the unattenuated output of the reference tap. When the tap attenuators are optimally adjusted, the transversal equalizer compensates for both phase and amplitude distortion added to the transmitted signal by the transmission channel.

When adjacent and nonadjacent dibit comparisons are being made in the error detection system of my copending joint application, valid comparisons are being made during the central portions of each signaling interval. During transition intervals the comparison necessarily fails and the error detection circuit indicates an apparent error. The signal from the error detection circuit is available continuously, although for error detection purposes it has significance only at the center of the signaling interval. For the purposes of this invention the continuously available output of the error detection circuit is intergrated over many signaling intervals and periodically quenched to a reference value. Just prior to quenching the intergrated value is sampled and stored for comparison with succeeding sampled values. If successive integrated values are substantially the same, the indication is that the distortion has stabilized. In general, however, there exists a finite difference between the stored value and the present integrated values. Accordingly, it is arranged that an incremental tap attenuator adjustment on the transversal equalizer is made following each comparison.

No attempt is made to establish a direct correlation between successive comparisons and any particular tap setting, as in prior art transversal equalizers. Instead, a bias toward making adjustments in a direction to minimize the distortion is provided by starting with adjustments in an arbitrary direction and continuing the adjustments in the same direction as long as the present integrated value is smaller than the stored value. Whenever the present value exceeds the stored value, however, the direction of the tap adjustment is reversed. Further, because of the absence of direct error correlation, taps are adjusted in an arbitrary sequence. Thus, a leading tap is adjusted a preselected number of times and then a lagging tap is adjusted the same number of times under the control of a steering circuit. This plan is carried out continuously. It has been found that there is no interaction between adjustments made at different taps and the order of tap adjustment is not critical.

It is an important feature of this invention that it can be implemented as an applique unit with conventional logic circuits and counters and that the complete circuit requires no changes in the basic phase-modulation receiver or in the error detection circuit, which is also an applique unit. Thus, existing data receivers can be updated to provide error detection and correction plus automatic adaptive equalization without the disadvantage of obsoleting them.

Another feature of this invention is the independence of the equalizer from the system clock. The integration period for the error signal is arbitrary in relation to system timing.

DESCRIPTION OF THE DRAWINGS

The above and other features and objects of this invention will be appreciated from a consideration of the following detailed description and the drawing in which.

DETAILED DESCRIPTION OF THE ILLUSTRATIVE EMBODIMENT

(1) Principle of the invention

Reference is made to P. A. Baker Pat. 3,128,342 issued Apr. 7, 1964 for details of the differential encoding of serial binary data in dibit pairs on a carrier wave of fixed frequency. Briefly, serial data bits are paired into dibits and through appropriate logic circuitry, the phase of the carrier wave is shifted at each dibit signaling interval with reference to the existing phase by an odd multiple of 45 electrical degrees according to a preselected encoding scheme. In terms of conventional 1 and 0 data bit representation there are four possible dibit pairs: 00, 01, 10 and 11. Dibits 00 and 10 are made to generate respective positive and negative 45° phase shifts. Dibits 01 and 11 similarly generate respective positive and negative 135° phase shifts. Thus, a phase shift occurs for every dibit to supply a discrete transition for the line signal at the end of each signaling interval to aid in timing recovery at the receiver. No special reference phase information need be transmitted, since each signaling interval supplies the reference phase for the next following interval.

Figure 1A:
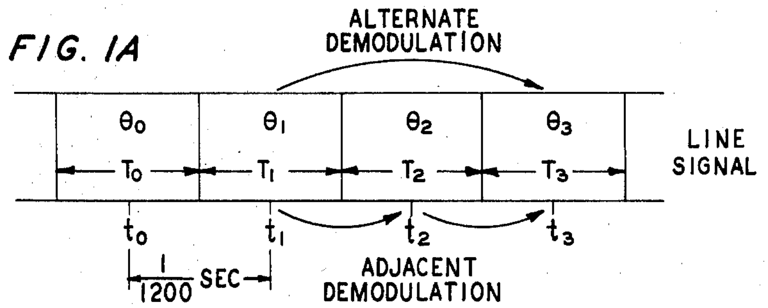
FIGS. 1A through 1E are waveform diagrams illustrative of the principle of the invention.

FIG. 1A shows a plurality of successive line signaling intervals $T_0$ through $T_3$, each having a duration in a typical private-line voice signaling band transmission system of 1/1200 second. The equivalent binary signaling rate is 2400 bits per second on a carrier wave of a frequency of 1800 Hz. The absolute phases transmitted in the respective signaling intervals are $\theta_0$ through $\theta_3$, generated as outlined above. The received signal is demodulated from successive phase differences observed at sampling instants $t_0$ through $t_3$, as described in more detail in P. A. Baker Pat. 3,128,343, granted Apr. 7, 1964. Each discrete received phase is delayed by one dibit signaling interval and nonlinearly intermodulated with the phase of the next following signaling interval to demodulate encoded dibits. Thus, the difference between present phase $\theta_2$ taken at sampling instant $t_2$ and the previous delayed phase $\theta_1$ represents a transmitted dibit. The curved arrows in FIG. 1A between sampling instants $t_1$ and $t_2$ and between $t_2$ and $t_3$ represent such adjacent dibit demodulation.

Figure 1B:
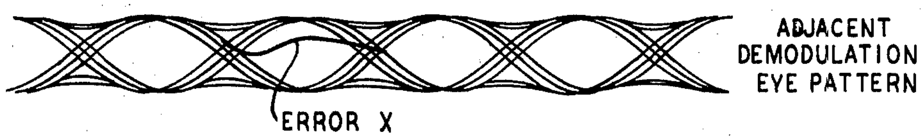

FIG. 1B represents an adjacent demodulation eye pattern resulting from superimposing on an oscilloscope successive output traces from a demodulator in a phase-modulation data receiver. The bunched-up lines where negative and positive traces intersect indicate zero crossing transitions between signaling intervals typically showing some time jitter in the received signal. Midway between these crossings lies the sampling instant, ideally at the time of maximum opening. The width of the eye opening is a measure of the margin against sampling time error and the height of the opening indicates the margin against noise. The slicing level is usually placed midway between upper and lower excursions of the traces.

Figure 1C:
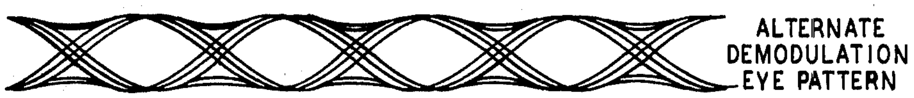

The curved arrow in FIG. 1A spanning sampling instants $t_1$ and $t_3$ represents alternate dibit demodulation as taught by my copending joint application for error detection purposes. The difference between present phase $\theta_3$ at time $t_3$ and delayed phase $\theta_1$ is demodulated to obtain an alternate dibit which, in the absence of error, correlates with adjacent dibits demodulated at times $t_2$ and $t_3$; namely, demodulated from the phase differences $(\theta_2-\theta_1)$ and $(\theta_3-\theta_2)$. The results of continuous alternate dibit demodulation can be displayed as another eye pattern as shown in FIG. 1C. The eye patterns of FIGS. 1B and 1C are similar in appearance and the comments made above with respect to that of FIG. 1B apply as well to the eye pattern of FIG. 1C.

Figure 1D:
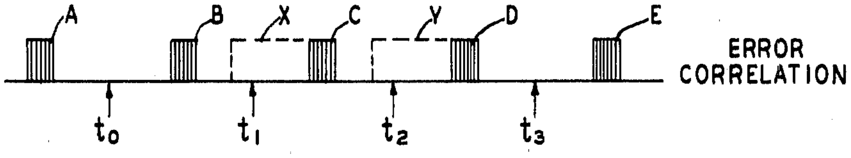

For error detection purposes alone the correlation of the eye patterns of FIGS. 1B and 1C have significance only at the center-eye sampling instants. However, if the correlation, i.e., checking two adjacent dibit demodulation against the corresponding alternate dibit demodulation, is carried out continuously, an error output as shown in FIG. 1D will be obtained. In general, no correlation will be obtained between adjacent and alternate demodulations in the transition periods and the error output will be up during these periods as shown by shaded areas A, B, C, D and E, corresponding respectively to the beginning of signaling intervals $T_0$ through $T_3$ and the end of interval $T_3$. For normal error-free operation the error output is down at sampling instants $t_0$ through $t_3$. However, as shown in FIG. 1B an error trace X is assumed in the adjacent dibit eye pattern. This trace straddles the slicing level and the demodulation is ambiguous. Therefore, the error output is up at sampling time $t_1$ as shown by the broken line marked X. Because the error correlation in successive signaling intervals has a common term the correlation also fails in the succeeding signaling interval and gives rise to the error signal Y as well as X, as shown in FIG. 1D. The error is a single error appearing only in the $T_1$ line signaling interval, but is manifested in two successive intervals in the error wave by the manner in which error correlation is performed. In the error circuit according to my copending joint application error correction action is triggered by two successive error indications.

Figure 1E:
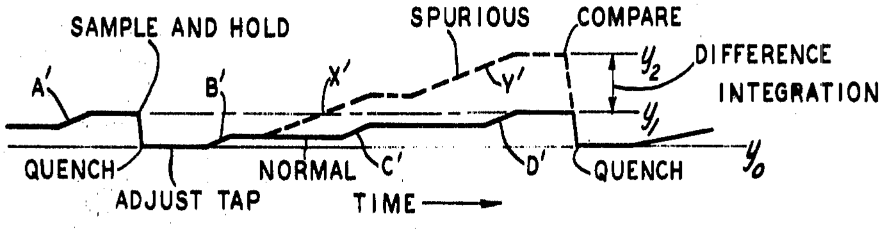

According to the present invention, the continuous error correlation signal is integrated over periods long with respect to the signaling interval, as is illustrated in FIG. 1E. Assume that in a prior error-free integration period, the integration level for the error signal reaches amplitude $y_1$. The integration is quenched to zero reference level $y_0$ at some arbitrary time and level $y_1$ is stored. Integration begins again and at each of intervals B, C and D of the error signal the integration level increases. At the end of the integration period, spanning for purposes of illustration transitions B, C and D, the integration level is again at level $y_1$ or very close thereto just prior to quenching. The solid trace in FIG. 1E represents normal integration, when no errors are being detected. Taking error indications X and Y into account causes the integration level to increase along the broken-line trace so that at quenching time level $y_2$ is attained. The fact that present level $y_2$ is measurably greater than stored level $y_1$ indicates that distortion in the transmission medium has increased and corrective action is necessary in the equalizer.

Since the integrated error signal yields no information as to the nature of the distortion or its correlation with any particular error occurrence, the corrective action is taken on a statistical basis. An incremental change is made in the equalizer after every quenching of the integrator and in the same direction as long as the present integrated value is less than the stored value. However, whenever the present value exceeds the stored value, the direction of the incremental change is reversed. Thus, no sudden changes are made in the equalizer, but over a period of time the distortion correction is biased toward minimization.

(2) Illustrative embodiment

Figure 2:
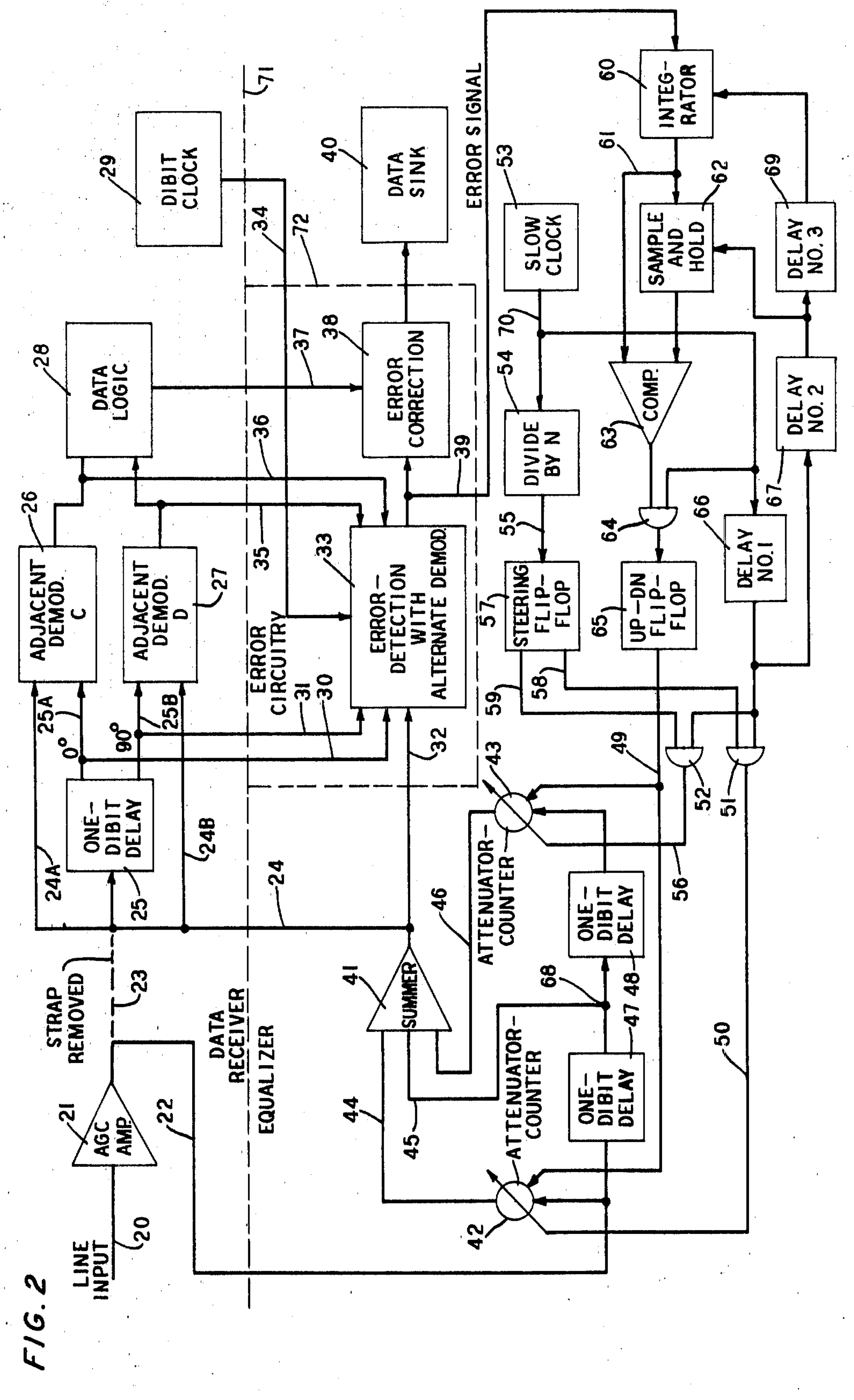
FIG. 2 is a block diagram of an illustrative embodiment of an automatic adaptive equalizer controlled by an error detection circuit for a differentially coherent phase-modulation data transmission system.

FIG. 2 is a block schematic diagram of the automatic equalizer of the invention shown in combination with a differentially coherent phase-modulation data receiver and an error detection circuit. Above horizontal broken line 71 there is shown in simplified form a phase-modulation data receiver constructed according to the teachings of P. A. Baker Pat. 3,128,343. The received signal appearing at line input 20 in the form shown in FIG. 1A comprises a succession of absolute phases $\theta_n$ differing by 45 or 135 electrical degrees from one signaling interval to the next. The amplitude of the received signal is normalized in automatic gain control circuit 21 and applied to the demodulator by way of strap 23. In the absence of the equalizer of this invention strap 23 is in place between amplifier 21 and lead 24. Lead 24 extends directly to one-dibit delay unit 25 and by way of conductors 24A and 24B to respective demodulators 26 and 27. Delay unit 25 delays its input by one signaling interval and also splits the phase into quadrature components. The 0° component from delay unit 25 is applied to demodulator 26 by way of lead 25A. Demodulator 26 demodulates the serial bit corresponding to the C bit or first portion of the dibit encoded by the difference in phase between successive signaling intervals $(\theta_n-\theta_{n-1})$. The 90° component from delay unit 25 is applied to demodulator 27 by way of lead 25B. Demodulator 27 similarly demodulates the D bit or second portion of the dibit encoded by the difference in phase between the same successive signaling intervals. The parallel bits in the outputs of demodulators 26 and 27 are sampled and converted to serial form in data logic unit 28 for application to a data sink. In the absence of an error correction circuit the output of data logic 28 is connected directly to data sink 40. The data receiver also includes a clock circuit 29, which is synchronized with the transitions in the received line signal in a well known manner. The eye pattern shown in FIG 1B can be observed at the output of either demodulator 26 or 27.

In accordance with the teachings of my copending joint application the error detection and correction circuit 72 can be provided as an applique to the basic data receiver. Error detection unit 33 accepts as inputs the output of amplifier 21 on leads 24 and 32, the 0° and 90° delayed outputs of delay unit 25 on respective leads 30 and 31, the outputs of demodulators 26 and 27 on respective leads 35 and 36, and a clock signal on lead 34. Error detection unit 33 further delays by one additional signaling interval the signal on leads 42, 30, 31, 35 and 36 and also shifts the phase of the input on lead 32 by 45°. Intermodulation of the phase shifted and delayed inputs on leads 32, 30 and 31 generates an alternate dibit corresponding to the phase difference $(\theta_n-\theta_{n-2})$ in a manner analogous to the demodulation of the adjacent dibit in demodulators 26 and 27. The delayed signals from leads 35 and 36 correspond to the dibit demodulated in the previous signaling interval, equivalent to $(\theta_{n-1}-\theta_{n-2})$. Logical comparison of the present alternate dibit with the present and previous adjacent dibits as explained in my copending joint application is equivalent to solving the equation $$[(\theta_n-\theta_{n-2})=(\theta_n-\theta_{n-1})+(\theta_{n-1}-\theta_{n-2})]$$

and generates an error correlation signal as shown in FIG. 1D. This signal is available on lead 39. Error correction circuit 38 triggered by the error signal reconstructs any dibit found to be in error and delivers the correct data to data sink 40. However, the existence of error correction circuit 38 is external to this invention.

In accordance with this invention the remainder of FIG. 2 is added as an applique unit to the basic data receiver appearing above line 71 and the error circuit 72. Strap 23 is removed from the data receiver and the output of amplifier 21 is extended by way of lead 22 to a transversal equalizer, whose output in turn is connected by way of lead 32 back to the data demodulator. The equalizer proper comprises a plurality of dibit-interval delay units, such as delay units 47 and 48; a plurality of incrementally adjustable attenuator-counters, such as those designated 42 and 43; and a summation circuit 41. For reasons of simplicity only two delay units are shown. More may be required in a practical situation. The junction 68 between delay units 47 and 48 serves as a reference. A complete delay line is usually continuous with taps equally spaced therealong. Delay units 47 and 48 represent the delay between such taps.

Attenuator-counters 42 and 43 are located at the respective input and output of the complete delay unit, and are of the type disclosed in F. K. Becker et al. Pat. 3,292,110 granted Dec. 13, 1966. If the reference tap at junction 68 is considered always to represent present time, the output of unit 48 represents past time and the input of unit 47, future time. When the distortion characteristic is constant over an extended period, complementary settings in the range of plus and minus unity gain can be found which will effectively balance the leading and lagging distortion components against each other so that their summation is substantially zero. Thus, the reference output on lead 45 to summer 41 will be substantially the net output of the summer on lead 24. It is the purpose of this invention to obtain settings for attenuator-counters, such as those designated 42 and 43, in incremental steps to realize this result. This is accomplished under the control of the error output of error detection circuit 33.

The equalizer control circuit comprises integrator 60; sample and hold circuit 62; comparator 63; directional (up-down) flip-flop 65; independent (slow) clock circuit 53; frequency divider 54; steering flip-flop 57; and delay units 66, 67 and 69. The error signal on lead 39 is continously integrated in integrator 60, a conventional capacitor charging circuit. Initially, sample and hold circuit 62 stores some value previously derived from integrator 60. The direct output of integrator 60 by way of lead 61 and the stored output in sample and hold circuit 62 are together applied to comparator 63, which may be a conventional differential amplifier. The output of comparator 63 is positive or negative depending on whether the present output of integrator 60 lies below or above the output of sample and hold circuit 62. The comparator output is gated to the toggle or complementing input of directional (up-down) flip-flop 65 by way of AND-gate 64. AND-gate 64 is enabled periodically by slow clock 53, which typically can generate a square wave at a rate of four Hz. Clock 53 may advantageously include in its output a one-shot multivibrator (not shown) which is triggered by a transition in the clock square wave. If the output of comparator 63 is, say, positive, flip-flop 65 is toggled to its opposite state. No toggling then occurs for negative inputs. The output of flip-flop 65 is connected in common to inputs of attenuator-counters in the equalizer to determine the direction of their incrementation, i.e., in the increasing direction if positive and in the decreasng direction, if negative. The attenuator-counters do not increment at this instant, however.

The count inputs of attenuator-counters 42 and 43 are indicated diagrammatically by the arrows traversing the circles to show adjustability. These inputs are activated in the alternative on leads 50 and 56 respectively by AND-gates 51 and 52 under the control of steering flip-flop 57 by way of leads 58 and 59. The purpose of steering flip-flop 57 is to determine in an orderly sequence which of attenuator-counters 42 and 43 is to be incremented. The output of clock 53 is divided down by an arbitrary number N in divider 54. A convenient value for N is 32. Steering flip-flop 57 is then complemented by the output of divider 54 over lead 55. The complementary outputs of flip-flop 57 on leads 58 and 59 then alternately enable AND-gates 51 and 52 for respective $N/2$ cycles of clock 53. In the illustrative embodiment of FIG. 2 attenuator-counters 42 and 43 are incrementally adjusted sixteen times each in successive four-second intervals, determined by the output of slow clock 53.

Attenuator-counters 42 and 43 have been primed by the output of directional flip-flop 65. The output of clock 53 delayed by a sufficient time in delay unit 66 to avoid a race condition now enables AND-gates 51 and 52. An attenuator-counter 42 or 43 is thus incremented. After a further short delay in delay 67 sample and hold circuit 62 is caused to assume the present voltage level of integrator 60. A still further delay is provided in delay unit 69 to cause the quenching of integrator 60. At the four-Hz. rate selected for clock 53 the period of integration extends over 250 milliseconds or 300 signaling intervals at the 1200 dibit per second transmission rate. One cycle of operation has been completed.

The cycle of operation can be summarized as follows:

(1) Compare the present integrator output with the stored previous integrator output and complement the directional flip-flop if the present output exceeds the stored output. Do not change the state of the flip-flop otherwise.

(2) Increment an attenuator-counter under the joint control of the directional and steering flip-flops, the steering flip-flops directing slow clock pulses to respective attenuator-counters group sequentially.

(3) Sample and hold the present integrator output for the next cycle of operation.

(4) Quench the integrator.

Since the attenuators are incremented at the end of each 250-millisecond cycle as above described, the changes made are gradual and cause no abrupt disturbances to the system. An occasional spurious adjustment will not disrupt the system. Once optimum equalization has been achieved within the size of the incremental step, subsequent cycles of operation generate a gentle random swing about the optimum until a significant change in the system occurs. With the aid of this invention switched network telephone lines can potentially furnish reliable phase-modulation rates heretofore attainable only on leased lines.

While this invention has been disclosed in terms of a specific illustrative embodiment, many modifications will occur to those skilled in the art within its spirit and scope.

What is claimed is:

1. In combination with a differentially coherent phase-modulation data transmission system in which signal dibits demodulated from differences in phase between successive adjacent signaling intervals are compared with dibits demodulated from differences in phase between nonadjacent signaling intervals spanning such successive adjacent signaling intervals to obtain a continuous error signal, an automatic equalizer for such system comprising a delay line in tandem with a receiver for such system having taps thereon spaced at said signaling intervals, incrementally adjustable attenuators at each of said taps but a reference tap, and a summing circuit combining the direct output of said reference tap with the attenuated outputs of all other taps;

means periodically integrating said error signal;

means comparing the integrated values obtained in successive periods by said integrating means to generate tap-attenuator control signals; and means sequentially adjusting said tap attenuators in accordance with said control signals to compensate for distortion in said system.

2. The combination defined in claim 1 in which said comparing means comprises sample-and-hold means storing integrated error signals from said integrating means between integration periods; and differential amplifier means jointly responsive to said integrating means and said sample-and-hold means.

3. The combination defined in claim 1 in which said sequential adjusting means comprises timing means determining the duration of said integrating period;

means subdividing the timing rate of said timing means; and means under the control of said subdividing means directing timing pulses from said timing means to cause successive pluralities of incrementations of different tap attenuators in an orderly sequence.

4. The combination defined in claim 1 in which said comparing means includes directional flip-flop means which changes output state responsive to only one polarity of difference between comparisons of successive integrated values whereby said tap attenuator control signals direct continued incrementation in the same direction whenever the previous integrated value exceeds the present integrated value and in the opposite direction otherwise.

5. Apparatus for adaptively and continuously readjusting the attenuators in a transversal equalizer in circuit with the receiver for a differentially coherent phase-modulation data signal comprising error detection means generating a continuous error signal from a correlation of the sum of phase differences between successive adjacent signaling intervals with the phase difference between nonadjacent signaling intervals corresponding to such adjacent signaling intervals;

means integrating said error signal over successive periods many times the length of said signaling intervals;

means comparing maximum integrated values of said error signal from period to period to derive a difference signal whose polarity characterizes an increase or decrease in distortion of said data signal; and means under the control of said difference signal determining the direction of incremental adjustment of said attenuators at the termination of each period to reduce said distortion.

6. Apparatus in accordance with claim 5 in which said integrating means includes means periodically quenching the output of said integrating means to a reference level.

7. Apparatus in accordance with claim 5 and timing means periodically directing sampling of the output of said comparing means to control the direction of tap attenuator incrementation, the instant of incrementation of a tap attenuator, the sampling and storing of the present level of said integrating means, and the quenching of said integrating means in orderly sequence.

8. Apparatus in accordance with claim 7 in which said timing means also directs sequential plural incrementations of different tap attenuators.

9. In combination with a differentially coherent phase-modulation data transmission system in which signal dibits demodulated from differences in phase between successive adjacent signaling intervals are compared with dibits demodulated from nonadjacent signaling intervals spanning such successive adjacent signaling intervals to obtain a continuous error signal, the method of controlling the incremental adjustment of tap attenuators on a transversal equalizer in a receiver for such transmission system comprising the repetitive steps of (a) periodically integrating and quenching said error signal;

(b) sampling the integration level attained just prior to quenching;

(c) storing said integration level from period to period;

(d) comparing the stored integration level from the end of the prior period with the integration level attained at the end of the present period to generate a control signal directing continued incrementation of tap attenuators in the same direction if the stored level exceeds the present level and directing a reversal of the direction of incrementation of tap attenuators otherwise; and (e) effecting alternate incrementation of different tap attenuators in orderly sequence at the end of each integration period in the direction directed by said comparing means.

References Cited

UNITED STATES PATENTS 3,414,845 12/1968 Lucky ---------------- 333—18

ROBERT L. GRIFFIN, Primary Examiner

K. W. WEINSTEIN, Assistant Examiner

U.S. Cl. X.R.

178—67, 88; 325—320; 333—18